Figure 1:
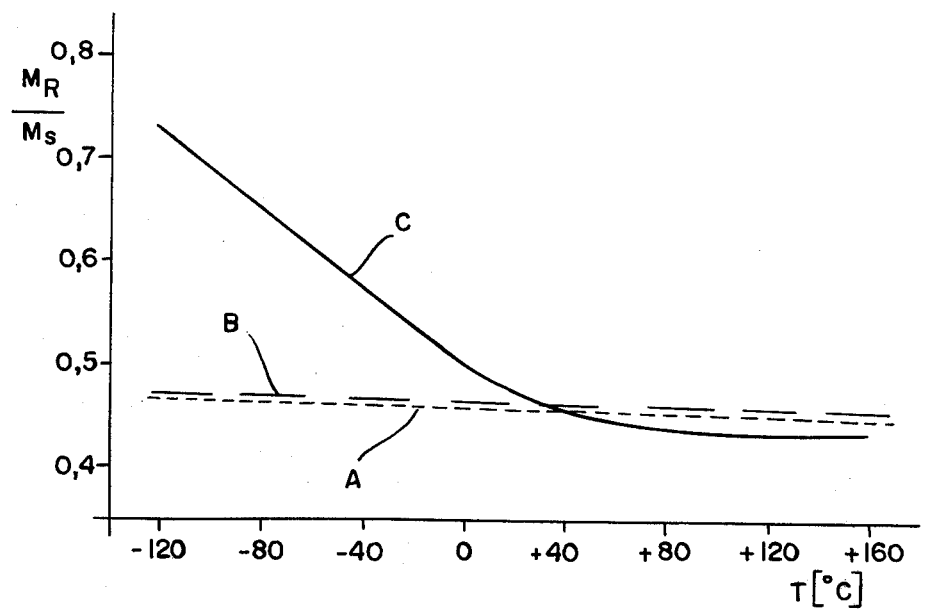

United States Patent [19]

Schoenafinger et al.

[11] 4,064,292
[45] Dec. 20, 1977

[54] MANUFACTURE OF COBALT-MODIFIED γ-IRON(III)OXIDES

[75] Inventors: Eduard Schoenafinger, Ludwigshafen; Matthias Schwarzmann, Limburgerhof; Eberhard Koester, Frankenthal, all of Germany

[73] Assignee: Badische Anilin- & Soda-Fabrik, Aktiengesellschaft, Ludwigshafen (Rhine), Germany

[21] Appl. No.: 656,800

[22] Filed: Feb. 10, 1976

Related U.S. Application Data

[63] Continuation of Ser. No. 393,040, Aug. 30, 1973, abandoned.

[30] Foreign Application Priority Data

Sept. 1, 1972   Germany .......................... P2243231

[51] Int. Cl.$^2$ ............................................. H01F 10/02
[52] U.S. Cl. ................................... 427/132; 427/127; 427/128
[58] Field of Search ................................ 427/127–132, 427/48; 428/900, 539

[56] References Cited

U.S. PATENT DOCUMENTS 3,770,500   11/1973   Imaoka et al. ................. 427/132 UX Primary Examiner—Bernard D. Pianalto
Attorney, Agent, or Firm—Keil, Thompson & Shurtleff

[57] ABSTRACT

The invention relates to the manufacture of acicular cobalt-modified γ-iron(III) oxide by coating an acicular α-iron(III) oxide or its hydrate with an inorganic protective coating, subsequent reduction to magnetite at 350° to 650° C, application of the cobalt compound to this magnetite or to the γ-iron(III) oxide obtained therefrom by oxidation, and subsequent heat treatment at 80° to 300° C, if necessary with simultaneous oxidation of the magnetite to the corresponding γ-iron(III) oxide. This iron oxide has high coercivity and can be used as the magnetic component in magnetic recording media for recording high frequencies without having the disadvantage of thermal and mechanical instability.

5 Claims, 3 Drawing Figures

MANUFACTURE OF COBALT-MODIFIED γ-IRON(III)OXIDES

This is a continuation of application Ser. No. 393,040 filed Aug. 30, 1973, and now abandoned.

The invention relates to a process for the manufacture of a cobalt-modified γ-iron(III) oxide ($\gamma\text{-}Fe_2O_3$) exhibiting improved thermal and mechanical stability, by applying a cobalt compound to an acicular γ-iron(III) oxide or acicular magnetite prepared in a certain way and subsequently heat-treating the γ-iron(III) oxide or magnetite thus obtained, and to magnetic recording media having magnetic pigments prepared in this way as the magnetic component.

It is known to modify iron oxides with cobalt for the purpose of producing magnetic pigments of increased coercivity. Such magnetic pigments are generally produced by co-precipitation, i.e. simultaneous precipitation of iron hydroxide and cobalt hydroxide, subsequent oxidation to α-FeOOH, dehydration thereof by conventional methods to give $\alpha\text{-}Fe_2O_3$, reduction of the latter to magnetite ($Fe_3O_4$) for example by means of hydrogen or carbon monoxide, and oxidation of the magnetite in air to give $\gamma\text{-}Fe_2O_3$. Cobalt hydroxide can also be precipitated onto the surface of acicular $\gamma\text{-}Fe_2O_3$ and heat-treated at about 380° to 400° C, the cobalt diffusing into the iron oxide lattice (compare DOS No. 2,036,612 and U.S. Pat. No. 3,573,980). However, it is known that cobalt compounds can also be precipitated onto a precursor of $\gamma\text{-}Fe_2O_3$, for example onto goethite (α-FeOOH), the cobalt diffusing into the lattice as a result of the temperatures used for the conversion reactions to $\gamma\text{-}Fe_2O_3$ (cf. U.S. Pat. No. 3,573,980).

However, the known cobalt-modified iron(III) oxides, when used as magnetic pigments, have the disadvantage that their resistance to elevated temperatures and mechanical stresses is distinctly less than that of unmodified γ-iron(III) oxides. Magnetic media are however intended to withstand temperatures of up to about 80° C without major losses in magnetization, since such temperatures can easily occur, for example when tapes and tape cartridges are stored in summer or are exposed to direct sunlight in automobiles. There is also a need for cobalt-modified γ-iron(III) oxides of improved thermal and mechanical stability in view of the mechanical stresses to which magnetic recording media are subjected, for example those which occur due to tension and friction when magnetic tapes pass over the guide pins when being rewound or which occur due to friction between the magnetic head and the disc in the case of magnetic discs.

An object of the invention is to provide a cobalt-modified γ-iron(III) oxide suitable for use as the magnetic pigment in magnetic recording media which, in contrast to conventional cobalt-modified γ-iron(III) oxides, exhibits a resistance to thermal and mechanical stresses which is substantially the same as that of unmodified γ-iron(III) oxide.

We have found that, surprisingly, the production of such a cobalt-modified γ-iron(III) oxide of improved stability, which is very suitable for use as the magnetic pigment for magnetic recording media, by applying a cobalt compound to acicular γ-iron(III) oxide or acicular magnetite and subsequently heat-treating the γ-iron(III) oxide thus obtained, or heat-treating the magnetite thus obtained with oxidation to γ-iron(III) oxide can be carried out by applying the cobalt compound to a γ-iron(III) oxide or magnetite, in the preparation of which an acicular iron oxide or its hydrate which prior to the reduction had been provided with a protective coating to prevent the needles from sintering together during the reduction reaction, was reduced to magnetite at 350° to 650° C, and by heating the γ-iron(III) oxide or magnetite treated with the cobalt compound at a temperature between 80° and 300° C.

According to the process of the invention, acicular γ-iron(III) oxide can be modified with cobalt in a conventional manner, but the cobalt-modified γ-iron(III) oxide is heated at 80° to 300° C especially at 120° to 250° C, and a specially prepared acicular γ-iron(III) oxide is used. In the conventional methods of manufacturing γ-iron(III) oxide, the precursor of magnetite, such as $\alpha\text{-}Fe_2O_3$ or its hydrate, namely goethite (α-FeOOH), is directly reduced to magnetite ($Fe_3O_4$), generally by means of hydrogen, carbon monoxide or hydrocarbons at temperatures of 300° to 400° C. The magnetite obtained is usually oxidized to γ-iron(III) oxide in the presence of air at temperatures of 200° to 400° C.

According to the invention, an acicular $\gamma\text{-}Fe_2O_3$ is used, during the preparation of which in the usual steps the products of the precursor of magnetite, such as $\alpha\text{-}Fe_2O_3$ or α-FeO(OH), in the form of needles, are provided with a protective coating which substantially prevents the fine acicular particles from sintering together during the subsequent reduction reaction at high temperatures. Treatment of the pigment with inorganic substances, such as oxygen acids of phosphorus and/or boron or their salts, is a particularly suitable method of preparing a generally inorganic protective coating which substantially encapsulates the pigment and which should be present on the surface of the acicular pigment in amounts which are generally about 0.1to 6%, especially 0.5 to 3%, by weight of the treated iron oxide or hydrated iron oxide. It is also possible to treat the pigment surface with hydroxides or oxides of aluminum, silicon, titanium, zirconium or chromium and these can of course also be produced on the pigment surface from salts of these elements which hydrolyze, for example from solutions of aluminum salts, titanium salts or zirconium salts, by adding alkali, or from alkali silicate solutions. The addition of phosphoric acid or soluble ammonium or alkali metal phosphates and pyrophosphates to the acicular pigments is a very suitable method. Further details regarding the preparation of protective coatings are given, for example, in Belgian Pat. No. 668,986 and German Published Application No. 1,592,214 and German Published Application No. 1,803,783.

A further important requirement for the preparation of the $\gamma\text{-}Fe_2O_3$ or magnetite used according to the process of the invention is that the magnetic precursors provided with the protective coating, such as α-FeOOH or $\alpha\text{-}Fe_2O_3$, should subsequently be reduced to magnetite ($Fe_3O_4$) at a temperature of from 350° to 650° C, preferably at a temperature of from 400° to 580° C, i.e. at very high temperatures. The reduction itself can be carried out in a conventional manner, preferably with hydrogen.

The oxidation of the magnetite ($Fe_3O_4$) to $\gamma\text{-}Fe_2O_3$ can then be carried out in a conventional manner, a suitable method being to pass air over it or expose it to oxygen at temperatures of about 200° to 400° C.

Although, in the process according to the invention, the $\gamma\text{-}Fe_2O_3$ manufactured as indicated is preferably modified with cobalt in a conventional manner, it is of course also possible to modify magnetite ($Fe_3O_4$), which is the precursor of $\gamma\text{-}Fe_2O_3$, with cobalt and then to heat the cobalt-modified magnetite in the presence of air or oxygen at temperatures between 80° and 300° C, preferably between 120° and 250° C, during which the oxidation to $\gamma$-$Fe_2O_3$ takes place.

Suitable cobalt compounds for modifying $\gamma$-$Fe_2O_3$ or magnetite with cobalt, which can be carried out in a conventional manner, are all cobalt compounds which at the temperature used decompose — if necessary after chemical conversion into cobalt hydroxide ($Co(OH)_2$) — into cobalt oxide or cobalt. Preferably, cobalt hydroxide is precipitated onto the iron oxide and this can be done, for example, by treating the iron oxide with aqueous solutions of cobalt salts, such as solutions of $CoSO_4$, and adjusting the pH value to above about 8, for example by adding an aqueous alkali metal hydroxide solution. The amount of cobalt compound added is preferably so chosen that the resulting heat-treated cobalt-modified $\gamma$-$Fe_2O_3$ contains about 0.25 to 15%, expecially 1.0 to 5.0%, by weight of cobalt.

During the heat-treatment of the cobalt-modified $\gamma$-$Fe_2O_3$ or magnetite in accordance with the invention, it is essential and critical to maintain a temperature between 80° and 300° C and in particular between about 120° and 250° C, since heat-treatment of the iron oxides at higher temperatures, for example at 380° to 400° C, surprisingly leads to magnetic pigments having different properties, and magnetic pigments heat-treated in this way may also exhibit a distinctly lower coercive force. The heat-treatment can be carried out in a conventional manner, for example in the presence of nitrogen or air, or in vacuo. To manufacture special pigments, it is also possible to impart special properties to the pigments by heat-treatment in a reducing atmosphere.

The cobalt-modified $\gamma$-iron(III) oxides manufactured according to the invention have, when used as magnetic pigments, surprisingly advantageous properties which differ distinctly from those of conventional cobalt-modified $\gamma$-iron(III) oxides and are in many respects similar to the properties of unmodified $\gamma$-$Fe_2O_3$. As is shown by the Examples which follow, this applies to the variation of the relative remanence $M_R/M_S$ and the remanence coercivity $H_R$ in the temperature range of $-120°$ to $+160°$ C, and to further properties. The products of the invention are therefore outstandingly suitable for use as magnetic pigments for magnetic recording media, such as magnetic tapes or magnetic discs, which are distinguished by special thermal and mechanical stability.

EXAMPLE 1 a. Manufacture of unmodified $\gamma$-iron(III) oxide

Acicular goethite manufactured in alkaline medium was dehydrated at 500° C to give $\alpha$-$Fe_2O_3$ and the latter was suspended in distilled water. The pH value of the suspension was then adjusted to about 3 by slowly adding dilute phosphoric acid. The product was filtered off and dried at about 120° C in a slight vacuum.

The dried product was heated to a temperature between 450° and 600° C in a rotating tube and then reduced to magnetite in the course of about 1 hour by passing hydrogen over it. The rotating tube was then allowed to cool to about 250° C and the product was oxidized to $\gamma$-$Fe_2O_3$ by passing a nitrogen-air mixture over it for 3 hours. The resulting acicular $\gamma$-$Fe_2O_3$ had a coercive force $H_c$ of about 396 oersteds at a tap density $\gamma$ of 1.0 g/cm³.

b. Manufacture of cobalt-modified $\gamma$-iron(III) oxide

To prepare an acicular magnetic pigment containing 1.5 per cent by weight of cobalt, the $\gamma$-$Fe_2O_3$ prepared as described above was impregnated in a conventional manner with an appropriate amount of an aqueous solution of cobalt sulfate ($CoSO_4$) and the pH value of the suspension was then adjusted to 12.0 by the dropwise addition of dilute aqueous sodium hydroxide solution. The product was then filtered off, washed until neutral and heated for 24 hours in a slight vacuum at 180° C. The magnetic pigment had a coercive force $H_c$ of 433 oersteds at a tap density $\gamma$ of 1.0 g/cm³.

EXAMPLES 2 to 3

In each case, the procedure of Example 1 was followed, but the heat treatment was carried out at 160°, 200°220°, 235° and 245° C respectively. The magnetic pigments obtained had practically the same coercivity as in Example 1(b).

COMPARATIVE EXPERIMENT 1

The procedure followed was exactly the same as in Example 1, except that the cobalt-modified $\gamma$-$Fe_2O_3$ was heated for half an hour at 380° C. The resulting pigment surprisingly had a coercive force $H_c$ of only 407 oersteds at a tap density $\gamma$ of 1.0 g/cm³.

COMPARATIVE EXPERIMENTS 2 TO 6

Instead of a $\gamma$-$Fe_2O_3$ prepared according to Example 1(a), a commercially available acicular $\gamma$-$Fe_2O_3$ prepared in alkaline medium was modified with cobalt, and the $\alpha$-iron(III) oxide was not provided with an inorganic protective coating before reduction to magnetite and was reduced to magnetite at 350° C. The unmodified $\gamma$-$Fe_2O_3$ had a coercive force $H_c$ of 320 oersteds at a tap density $\gamma$ of 1.0 g/cm³. The $\gamma$-$Fe_2O_3$ was modified in the manner indicated in Example 1(b), using the same amount of cobalt (1.5% by weight). Samples of the $\gamma$-$Fe_2O_3$ provided with precipitated cobalt hydroxide were then heated at different temperatures and the coercive force $H_c$ ($\gamma = 1.0$ g/cm³) of the magnetic pigments obtained in each case was measured. The following results were obtained:

| Comparative experiment No. | | 2 | 3 | 4 | 5 | 6 |
|---|---|---|---|---|---|---|
| Heat treatment temperature | ° C | 180 | 240 | 300 | 350 | 380 |
| Coercivity $H_c$ | | 360 | 354 | 346 | 385 | 433 |

EXAMPLE 6

The variation of the relative remanence $M_R/M_S$ in the temperature range from $-120°$ C to $+160°$ C was investigated. FIG. 1 shows the results of the measurements; curve A represents the values for unmodified starting oxide, $\gamma$-$Fe_2O_3$ (Example 1(a)), curve B the values for cobalt-modified $\gamma$-$Fe_2O_3$ prepared according to the invention and heated at 180° C (Example 1 (b)) and curve C the values for cobalt-modified $\gamma$-$Fe_2O_3$ heated at 380° C (Comparative Experiment 1). It can be seen that the cobalt-modified $\gamma$-$Fe_2O_3$ which has been heated at 380° C (curve C) shows the typical behavior of conventionally cobalt-modified $\gamma$-iron(III) oxides, whilst the behavior of the cobalt-modified $\gamma$-$Fe_2O_3$ prepared according to the invention (curve B) is virtually the same as that of unmodified $\gamma$-$Fe_2O_3$ (curve A).

EXAMPLE 7

Figure 2:
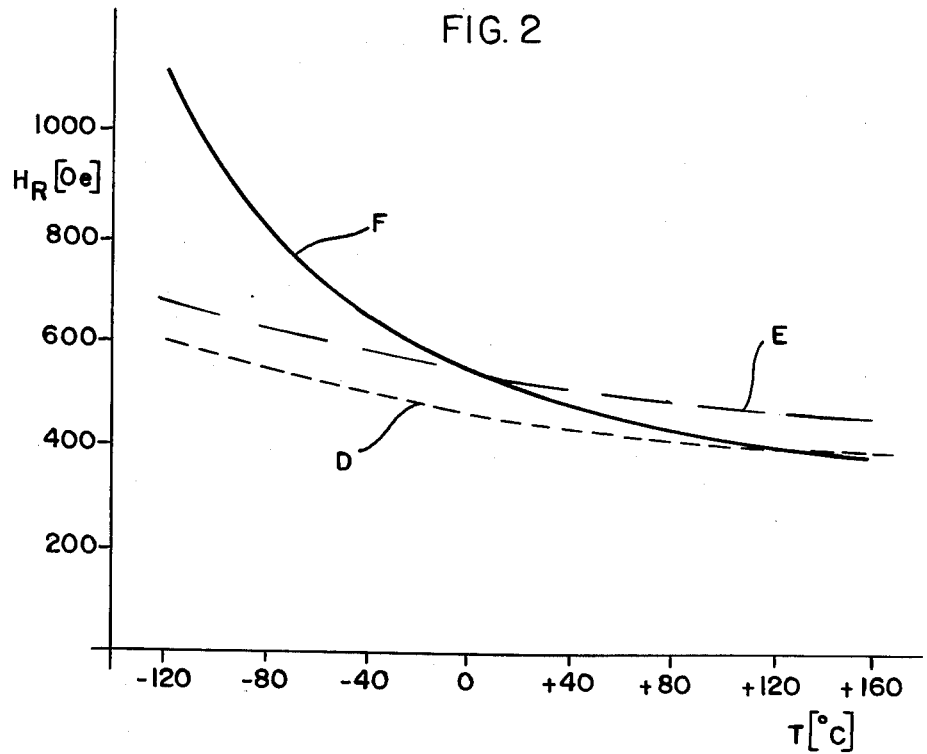

The remanence coercivity $H_R$ (oersteds) of a cobalt-modified $\gamma$-$Fe_2O_3$ prepared according to the invention and of two comparison samples was measured in the temperature range from $-120°$ C to $+160°$ C. FIG. 2 shows the results of the measurements; curve D represents the values for unmodified starting oxide, $\gamma$-$Fe_2O_3$ (Example 1(a)), curve E the values for cobalt-modified $\gamma$-$Fe_2O_3$ prepared according to the invention and heated at 180° C (Example 1(b)), and curve F the values for cobalt-modified $\gamma$-$Fe_2O_3$ heated at 380° C (Comparative Experiment 1). The behavior of the magnetic pigment heated at 180° C (curve E) is practically the same as that of unmodified starting oxide (curve D), but the $H_R$ value is increased distinctly by modification. The differential $\Delta H_R$ between curves D and E is retained even at temperatures above 0° C, in contrast to the cobalt-modified $\gamma$-$Fe_2O_3$ heated at 380° C.

EXAMPLE 8

Magnetic recording media having a polyethylene terephthalate base and a dispersion of the magnetic pigment in polyvinylformal binder as the magnetic coating were manufactured in the same way using, as the magnetic pigment, an unmodified starting oxide, $\gamma$-$Fe_2O_3$ (obtained according to Example 1(a)), a cobalt-modified $\gamma$-$Fe_2O_3$ prepared according to the invention and heated at 180° C (Example 1(b)) and a cobalt-modified $\gamma$-$Fe_2O_3$ heated at 380° C (Comparative Experiment 1) respectively. The magnetic tapes prepared using the three different magnetic pigments were recorded with a signal of 14 kcs ($\lambda = 6.35/\mu$) in the same manner in each case. The tapes were drawn at an angle of 90° over a knife-blade at a speed of 9.5 cm/sec and under a tension of 100 g. The level of the record signal was measured before and after the tapes had been drawn over the blade. The drop in signal level in db was as follows:

a. unmodified starting oxide, $\gamma$-$Fe_2O_3$ : 0 db
b. cobalt-modified $\gamma$-$Fe_2O_3$ heated at 180° C : 0 db
c. cobalt-modified $\gamma$-$Fe_2O_3$ heated at 380° C : $-0.6$ db

EXAMPLE 9

Figure 3:
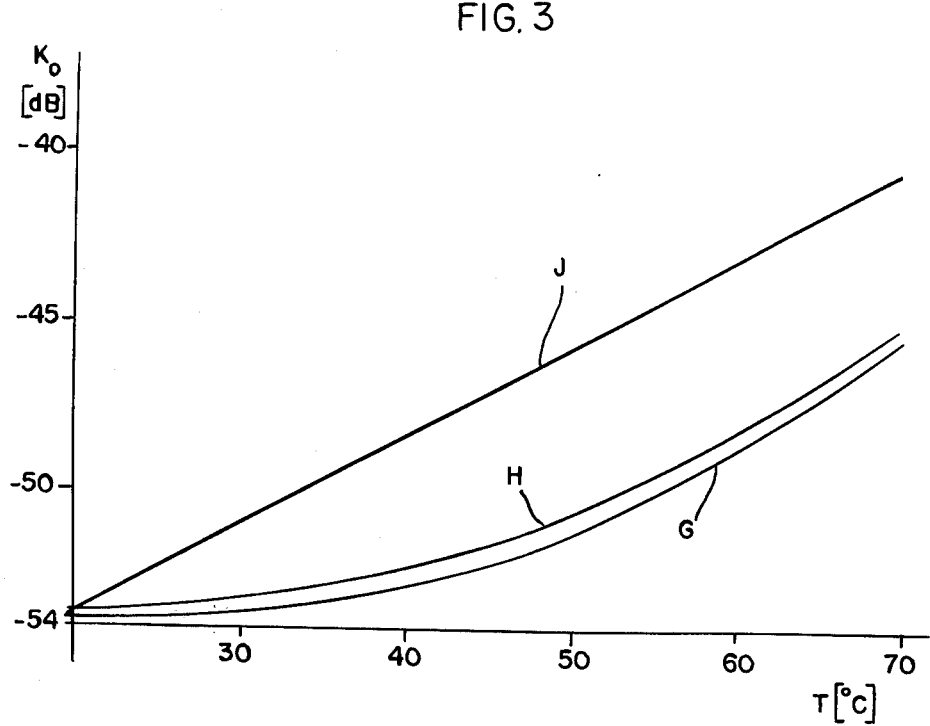

To test the behavior of magnetic recording media containing different magnetic pigments at temperatures above room temperature, such as occur, for example, when they are stored in summer or exposed to the sun, the increase in the print-through signal $K_o$ was measured in db as a function of the temperature. The results are shown in FIG. 3 in which curve G represents the values for a magnetic recording medium using unmodified starting oxide, $\gamma$-$Fe_2O_3$, (Example 1 a) as the magnetic pigment, curve H the values for cobalt-modified $\gamma$-$Fe_2O_3$ prepared according to the invention and heated at 180° C, as the magnetic pigment, and curve J the values for $\gamma$-$Fe_2O_3$ modified with cobalt in a conventional manner, as the magnetic pigment.

Whilst tapes with conventionally cobalt-modified $\gamma$-$Fe_2O_3$ as the magnetic pigment show a distinctly more marked increase in the print-through signal, the increase in the print-through signal is distinctly less in the case of magnetic recording media with cobalt-modified $\gamma$-$Fe_2O_3$ manufactured according to the invention and corresponds to that of tapes with the unmodified $\gamma$-$Fe_2O_3$ starting oxide.

We claim:

1. A magnetic recording medium of high coercivity and improved thermal and mechanical stability comprising: a base and a magnetic coating comprising magnetic pigment dispersed in a resin binder on said base, said magnetic coating containing as the magnetic pigment, a cobalt-modified gamma-iron (III) oxide which has been prepared by applying a cobalt compound which at the temperature used decomposes into cobalt oxide or cobalt to an acicular gamma-iron (III) oxide or an acicular magnetite, and subsequently heating the gamma-iron (III) oxide to which said cobalt compound has been applied or heating the magnetite to which said cobalt compound has been applied under oxidation conditions to form gamma-iron (III) oxide, said gamma-iron (III) oxide or magnetite having been formed from the magnetite precursor acicular iron oxide or its hydrate which prior to reducing the precursor to form magnetite was substantially encapsulated with from about 0.1 to 6% by weight based on the weight of the iron oxide or its hydrate of an inorganic protective coating to prevent the needles of the precursor from sintering together during the reduction reaction, said reduction reaction taking place at a temperature of from 350° to 650° C, and wherein the gamma-iron (III) oxide or magnetite to which the cobalt compound was applied is heated at a temperature of between 80° and 300° C.

2. A magnetic recording medium as set forth in claim 1 wherein a cobalt compound is applied to an acicular $\gamma$-iron (III) oxide.

3. A magnetic recording medium as set forth in claim 2 wherein said cobalt treated $\gamma$-iron (III) oxide is heated at a temperature between 120° and 250° C.

4. A magnetic recording medium as set forth in claim 1 wherein said magnetite precursor is substantially encapsulated with a coating of an oxygen acid of phosphorus and/or boron, their salts, or hydroxides or oxides of aluminum, silicon, titanium, zirconium or chromium.

5. A magnetic recording medium as set forth in claim 1 wherein said magnetite precursor is substantially encapsulated with a coating of phosphoric acid.

* * * * *